(12) United States Patent
Hui et al.

(10) Patent No.: US 8,811,905 B1
(45) Date of Patent: Aug. 19, 2014

(54) POWER SAVINGS AND INTERFERENCE REDUCTION FOR MULTIMODE DEVICES

(75) Inventors: Yan Hui, San Diego, CA (US); Edwin Park, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 690 days.

(21) Appl. No.: 12/873,173

(22) Filed: Aug. 31, 2010

Related U.S. Application Data

(60) Provisional application No. 61/239,171, filed on Sep. 2, 2009.

(51) Int. Cl.
*H04B 1/00* (2006.01)
*H04B 15/00* (2006.01)
*H04B 1/38* (2006.01)
*H04M 1/00* (2006.01)

(52) U.S. Cl.
USPC .......................... 455/63.1; 455/561; 455/574

(58) Field of Classification Search
None
See application file for complete search history.

(56) References Cited

U.S. PATENT DOCUMENTS

| | | | | |
|---|---|---|---|---|
| 5,574,979 | A * | 11/1996 | West | 455/63.1 |
| 8,489,152 | B2 * | 7/2013 | Chen et al. | 455/574 |
| 8,504,120 | B2 * | 8/2013 | Zhang | 455/574 |
| 2003/0128685 | A1 * | 7/2003 | Mahany et al. | 370/338 |
| 2004/0106431 | A1 * | 6/2004 | Laroia et al. | 455/552.1 |
| 2005/0113151 | A1 * | 5/2005 | Burke et al. | 455/574 |
| 2007/0082715 | A1 * | 4/2007 | Rofougaran et al. | 455/574 |
| 2009/0061781 | A1 * | 3/2009 | Zhang | 455/66.1 |
| 2011/0013548 | A1 * | 1/2011 | Chen et al. | 370/311 |

* cited by examiner

*Primary Examiner* — Yuwen Pan
*Assistant Examiner* — Ayodeji Ayotunde
(74) *Attorney, Agent, or Firm* — Van Pelt, Yi & James LLP

(57) ABSTRACT

Power savings and interference reduction for multimode devices (e.g., base stations and relay nodes) is disclosed. In some embodiments, power savings and interference reduction for multimode devices includes selecting a power state of the multimode device selected from a plurality of power states, in which the multimode device is in a first power state (e.g., an active or serving power state), and in which the selected power state is a second power state (e.g., a reduced power state), and transitioning the multimode device from the first power state to the second power state.

48 Claims, 11 Drawing Sheets

POWER SAVINGS AND INTERFERENCE REDUCTION FOR MULTIMODE DEVICES

CROSS REFERENCE TO OTHER APPLICATIONS

This application claims priority to U.S. Provisional Patent Application No. 61/239,171 entitled REDUCING POWER SAVINGS AND INTERFERENCE REDUCTION FOR BASE STATION AND RELAYS filed Sep. 2, 2009, which is incorporated herein by reference for all purposes.

BACKGROUND OF THE INVENTION

In a wireless network, base stations provide the link necessary for the terminal to send and receive data. Typically, these base stations are static in that they are not turned on or off. Furthermore, when base stations are on, the transmission does not cease and restart. Also, additions and deletions of base stations are infrequent. As data throughput increases and base station density increases, there is more overlap of the cell coverage area. Also, applications increasingly require higher quality of services (QoS).

BRIEF DESCRIPTION OF THE DRAWINGS

Various embodiments of the invention are disclosed in the following detailed description and the accompanying drawings.

DETAILED DESCRIPTION

Figure 1:
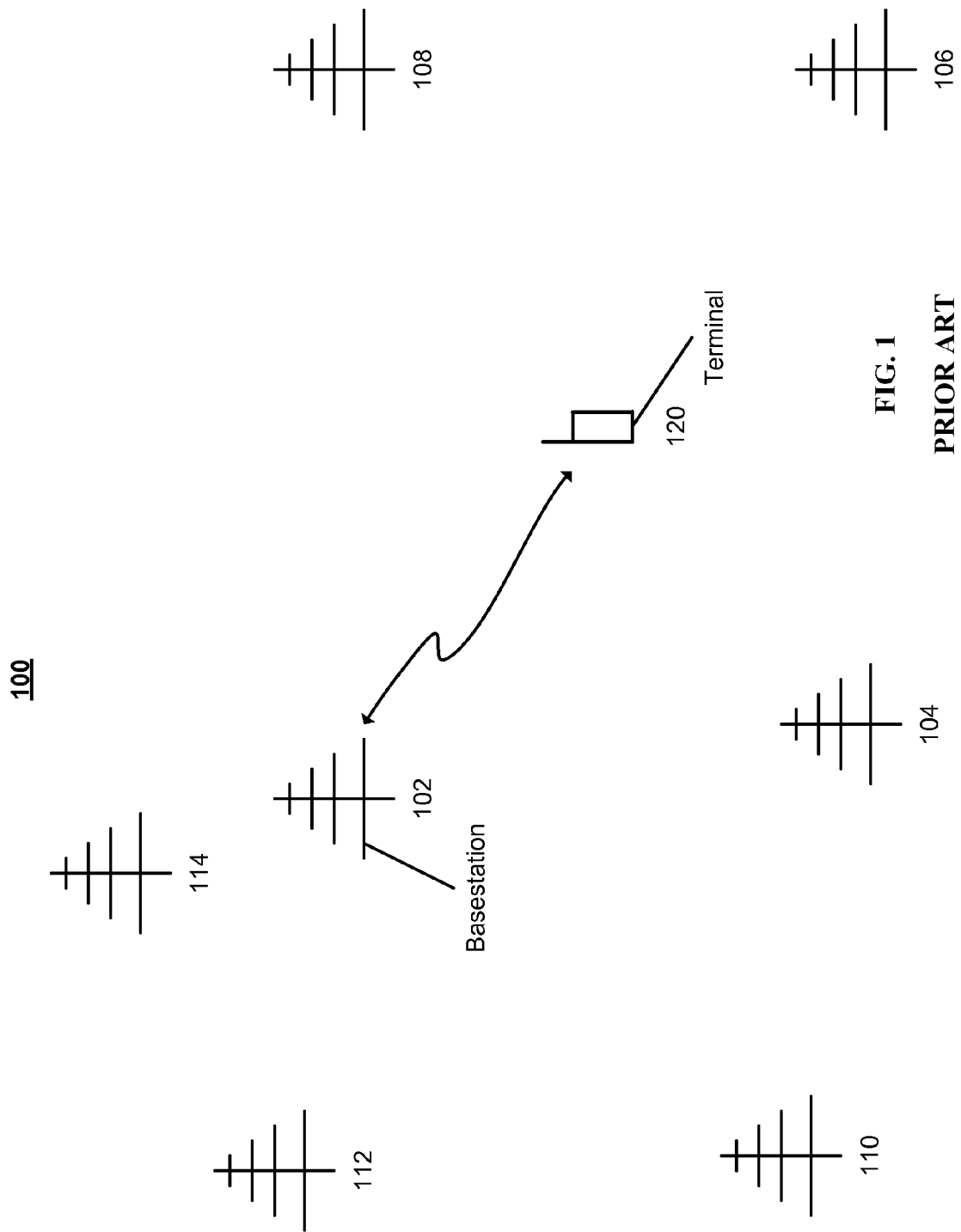
FIG. 1 provides an illustration of a typical wireless network of base stations and a terminal.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With an increasing number of wireless communication devices, such as multimode devices (e.g., base stations, such as macro stations, microcells, picocells, and femtocells; and other types of multimode devices, such as access points, relay nodes (e.g., relays, relay stations), other terminals (e.g., P2P terminals), and/or various other types of multimode devices) being deployed in wireless networks, more power is being transmitted and used. Furthermore, such increasing transmission can lead to greater interference (e.g., in areas of transmission spectrum overlap). Accordingly, various techniques are disclosed herein to, for example, cease or reduce base station transmissions. For example, with the reduction of such base station transmissions, there can be a reduction of interference, which can also increase the QoS. Also, the reduction of power can aid the operational cost for the wireless network carrier. As another example, various techniques are disclosed herein so that cells or sectors can be turned on or turned off.

Accordingly, power savings and interference reduction for multimode devices (e.g., base stations and relay nodes) is disclosed in accordance with some embodiments. In some embodiments, power savings and interference reduction for multimode devices includes selecting a power state of the multimode device selected from a plurality of power states, in which the multimode device is in a first power state (e.g., an active or serving power state), and in which the selected power state is a second power state (e.g., a reduced power state), and transitioning the multimode device from the first power state to the second power state. In some embodiments, a multimode device includes one or more of the following: a macrocell, a microcell, a picocell, a femtocell, an access point, a relay node, a repeater device, and a peer-to-peer terminal.

In some embodiments, techniques for wireless communication are provided, particularly related to multimode devices, such as a base station, access point, relay node, with different air-interfaces, functionality, or configurations. As used herein, the term "base station" generally refers to, for example and without limitation, any "femtocell", "picocell", "microcell", "macrocell", and/or other similar types of base station devices, and also includes, for example and without limitation, non-cellular stations, such as access points, relay points, repeater devices, relay nodes, and/or other similar types of non-cellular stations. As used herein, the term "terminal" generally refers to, for example and without limitation, any device communicating wirelessly with a base station or another terminal in the case of a peer-to-peer environment. Various embodiments disclosed herein, for example, provide for power savings for base stations and relays as well as the reduction of interference afforded by the reduction in the power. Various embodiments described herein, for example, disclose various new power states, tiered structures and/or organizations, power state transition techniques, and power state communication and signaling techniques to provide power savings and interference reduction for multimode devices.

In some embodiments, techniques for transitioning a base station to a reduced power state (e.g., lower transmission state) are provided. In some embodiments, architectures to facilitate reduced transmission while maintaining wireless network coverage and techniques to transition the base station back to an active power state (e.g., full transmission state) are provided. In some embodiments, a tiered set of base stations is disclosed. In some embodiments, a peer-to-peer structure is disclosed. In some embodiments, various communication and signaling techniques to determine and inform the power state of the base stations are disclosed. In some embodiments, various communication and signaling techniques so that terminal and/or base stations can properly measure (e.g., measure a signal strength of) the base stations are disclosed. Further, in some embodiments, techniques to transition a relay into a reduced power state (e.g., reduce or cease the transmissions from a relay) are disclosed.

FIG. 1 provides an illustration of a typical wireless network 100 of base stations and a terminal. For simplicity, only one terminal communicating to one base station is shown. As shown, a terminal 120 is communicating with base station 102. Also as shown, there are other base stations 104, 106, 108, 110, 112, and 114 in the wireless network 100. For example, assuming (for simplicity) if proximity is equivalent to signal strength, the terminal's next best candidate base stations in the wireless network 100 would be base stations 104, 106, and 108. In some embodiments, in the terminal views, a candidate base station is part of the candidate set. The other base stations in the wireless network 100 would be 110, 112, and 114. All of the base stations (i.e., wireless base stations 102, 104, 106, 108, 110, 112, and 114) would be transmitting even if there were only one terminal (e.g., terminal 120) present (e.g., in wireless communication presence) in the system (e.g., wireless network 100). In some embodiments, base stations (or sectors of a base station) in the active set are base stations with which the terminal is actively exchanging traffic channel information. In some embodiments, base stations (or sectors of a base station) in the candidate set are base stations that are not currently in the active set but have sufficient strength to indicate that the associated forward traffic channels could be successfully demodulated. In some embodiments, base stations (or sectors of a base station) in the neighbor set are base stations that are contenders to which the terminal may hand off. In some embodiments, base stations (or sectors of a base station) in the remaining set are base stations in the system that are not part of the active set, candidate set, or neighbor set.

Figure 2A:
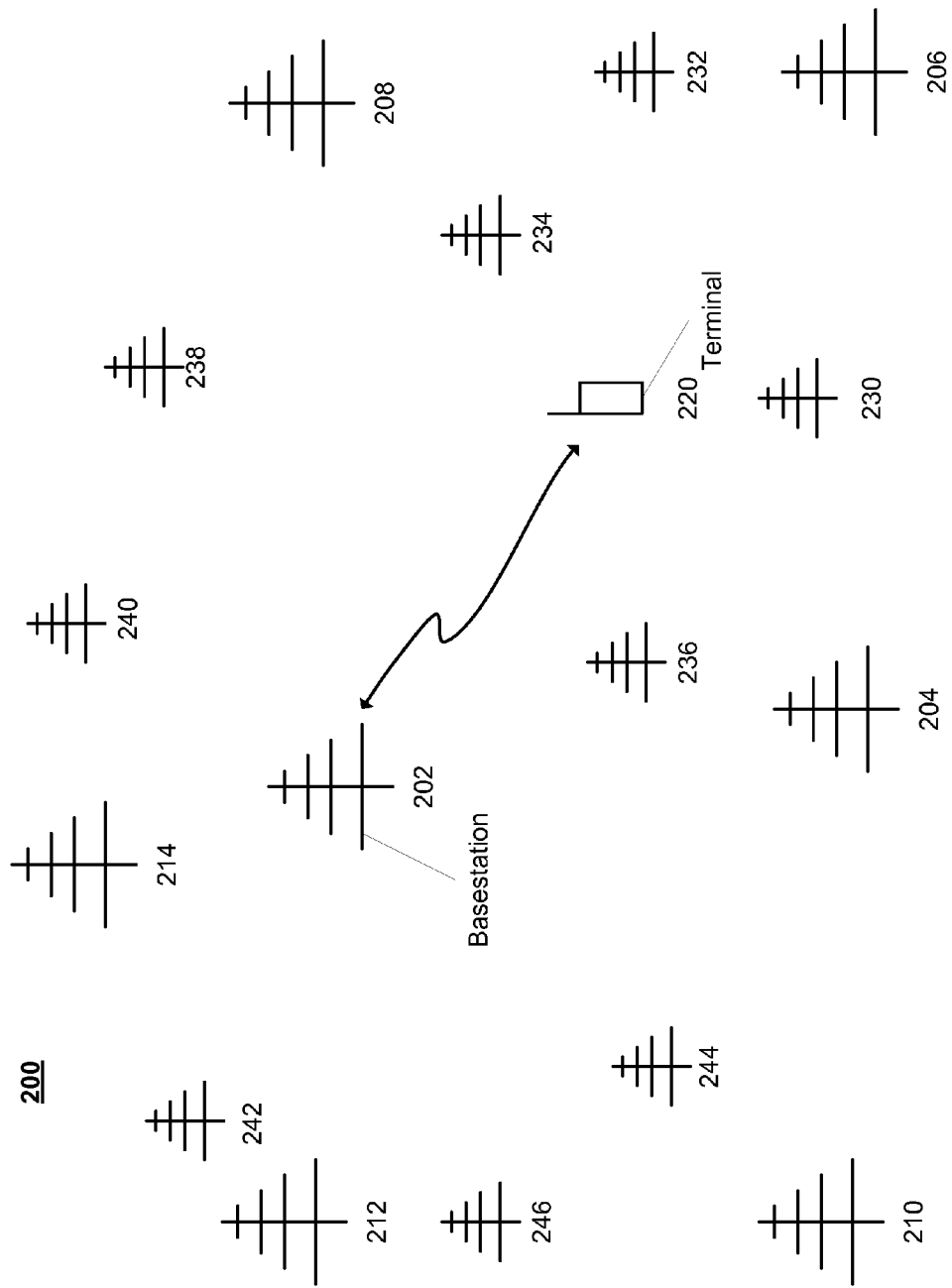
FIGS. 2A and 2B provide illustrations of a wireless network of base stations for providing power savings and interferences reduction in accordance with some embodiments.
Figure 2B:
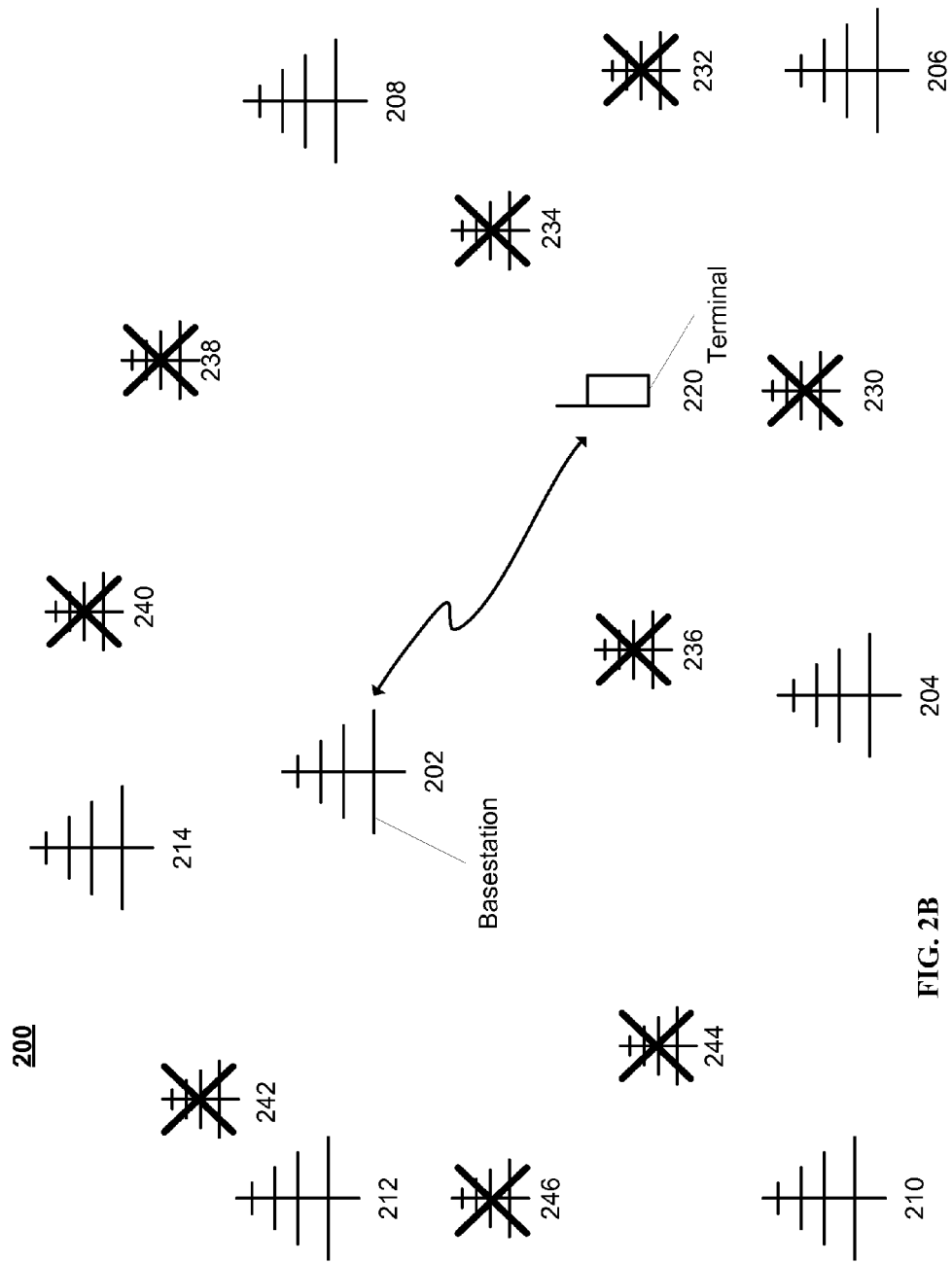

FIGS. 2A and 2B provide illustrations of a wireless network 200 including base stations for providing power savings and interferences reduction in accordance with some embodiments. For example, certain of the base stations can be in a reduced power state (e.g., a silent power state and/or a scan power state). In some embodiments, base stations in the silent power state are not communicating to a terminal and the base station's transmissions are reduced or terminated. In some embodiments, base stations in the silent power state have their receiver powered down (e.g., cease receiving) or receive less frequently (e.g., discontinuously). In some embodiments, base stations in the scan power state occasionally transmit (e.g., pilot, sync, and/or other signals) and/or occasionally receive (e.g., using a primary air interface, secondary air interface, and/or wired communication link) to determine when and if the base station should proceed to another power state, for example, the serving power state. For example, a base station in the scan power state can transmit so that the nearby terminals (e.g., or other base stations) can detect and measure the base station in the scan power state. Furthermore, base station in the scan power state may receive less frequently (e.g., discontinuously). In some embodiments, the scan power state can be removed or bypassed, and the multimode device can transition directly from the silent power state to the serving power state to allow for the detection and measurements. As shown in FIG. 2A, the wireless network 200 includes a terminal 220 communicating to a wireless base station 202 (e.g., for simplicity purposes of this illustration, only one terminal is shown but as would be apparent to those of ordinary skill in the art multiple terminals can be in wireless communication presence of the wireless network 200). Also as shown, the wireless network also includes wireless base stations 204, 206, 208, 210, 212, 214, 230, 232, 234, 236, 238, 240, 242, 244, and 246.

Referring now to FIG. 2B, the base stations 202, 204, 206, 208, 210, 212, and 214 are in active power states (e.g., serving power states), and base stations 230, 232, 234, 236, 238, 240, 242, 244, and 246 are in reduced power states (e.g., scan power states, silent power states, and/or disabled power states or powered down power states). Accordingly, the other base stations available in the wireless network 200 for wireless communication with the terminal 220 would be 204, 206, 208, 210, 212, and 214. For example, assuming (for simplicity) if proximity is equivalent to signal strength, the terminal's next best candidate base stations in the wireless network 200 would be active base stations 204, 206, and 208 and silent base stations 230, 232, 234, and 236. In some embodiments, the base stations shown in the reduced power states are present, but transmit using less power or have reduces or disabled transmissions (e.g., power levels, continuously, intermittent or reduced/disabled transmissions, and other techniques as further described herein) as the base stations shown in the active power states. As shown, silent base station 230, which is shown to be in a reduced power state, is the closest (e.g., geographical proximity and/or signal strength) base station to the terminal 220.

In some embodiments, base stations, such as macrocells, picocells, and/or femtocells or relays, can transition power state for power savings or reduced interference. For example, smaller cells or smaller base stations, such as picocells and femtocells, as opposed to larger cells or larger base stations, such as macrocells, are typically deployed in homes or small businesses with a typically more allocated user group that can be powered off when not in use or when users are not home or when a business is closed As another example, femtocells in a stadium can be powered down except when there is an event or game when there can be, for example, 10,000's of potential users.

Figure 3:
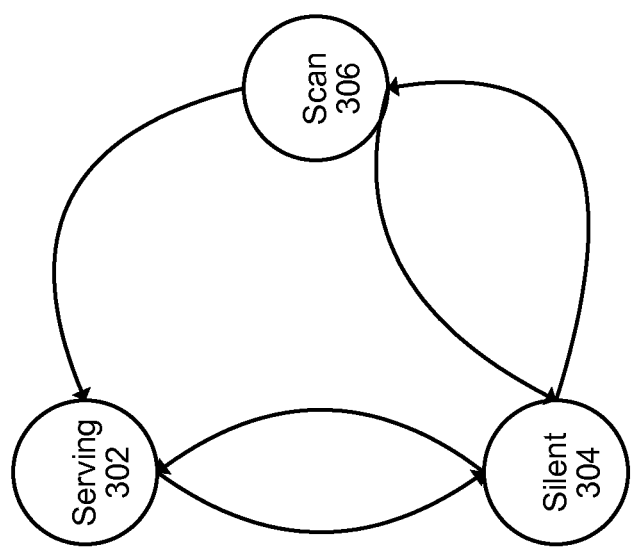
FIG. 3 is a state diagram illustrating a set of power states for a multimode device for providing power savings and interferences reduction in accordance with some embodiments.

FIG. 3 is a state diagram illustrating a set of power states 300 for a multimode device for providing power savings and interferences reduction in accordance with some embodiments. In some embodiments, the multimode device implements three power states (e.g., as would be apparent to one of ordinary skill in the art in view of the embodiments disclosed herein, fewer or greater power states can be implemented by the multimode device using the various techniques described herein). For example, additional power states can be implemented by the multimode device, and additional power states can be implemented for other classes of devices (e.g., relay nodes, as further described below). As shown in FIG. 3, serving power state 302, silent power state 304, and scan power state 306 constitute the power states implemented by the multimode device (e.g., base stations, relays, and/or peer to peer terminal). The serving power state 302 is the state in which, for example, the base stations (e.g., as described above with respect to FIGS. 2A and 2B) communicate with the terminal(s) (e.g., serving power state 302 can include multiple sub-states or different power states, such as an actively serving power state and available to serve but currently idle power state). The serving power state 302 also includes the condition when the base station is capable of communicating with a terminal, but no terminal requires its services. The silent power state 304 is the power state in which the base station is not communicating to a terminal and in which the base station's transmissions are reduced or terminated. For example, the receiver in the multimode device can be powered down (e.g., cease receiving) or receive less frequently (e.g., discontinuously) while in the silent power state 304. The scan power state 306 allows for occasional transmission (e.g., pilot, sync, etc.) and/or occasional reception (e.g., using a primary air interface, secondary air interface, and/or wired communication link) to determine when and if the base station should proceed to, for example, the serving power state 302. For example, a base station in the scan power state can transmit so that the nearby terminals (e.g., or other base stations) can detect and measure the base station in the scan state 306. In some embodiments, the scan state 306 can be removed or bypassed, and the multimode device can transition directly from the silent state 304 to the serving state 302 to allow for the detection and measurements. Though this example only shows three power states, other power states can also be implemented using the various techniques described herein. For example, in a relay node, there can be a power state to allow the state to transition from a non-transparent relay type to a transparent type and vice versa, as further discussed below.

Referring to FIG. 3, in some embodiments, the transition of the multimode device occurs autonomously or in concert with the other multimode devices in its proximity or with the assistance of a controller (e.g., network element) or any combination thereof. In some embodiments, the transition of the multimode device from one power state to another power state is reported to the nearby multimode devices and/or to the nearby terminals. For example, the transition of the multimode device from the serving power state 302 to the scan power state 306 can be reported to the nearby terminals (e.g., by the multimode device that is to transition or by another multimode device). The nearby terminals can continue to monitor the multimode device in scan power state 306 but will not try to establish a traffic channel with the multimode device in scan power state 306. Also, if the terminal desires to establish a traffic channel with the multimode device currently in the scan power state, the terminal can signal to the multimode device in the scan power state (e.g., or another nearby multimode device, such as in the serving power state, which will signal to the multimode device in the scan power state 306) requesting the multimode device in the scan power state to transition to the serving power state, so that the terminal can establish a traffic channel. The transition of the multimode device from the scan power state 306 to the servicing power state 302 can generate other message to the terminal or the other multimode devices or controller or other nearby terminals or any combination thereof. It will apparent to those of ordinary skill in the art that the messaging for implementing other transitions of the set of power states 300 (e.g., from the serving power state 302 to the silent power state 304) or any other power states can be implemented using the various techniques described herein or other similar techniques.

In some embodiments, the transition of the multimode device is reported to the terminal by the multimode device itself in a message reporting the power state. In some embodiments, the message includes the future power state of the multimode device. For example, the transition of the multimode device can also be reported to the terminal by another multimode device before, during, or after the transition. Also, the message can include the time of the transition. Also, the message can include the length of the transition. Furthermore, the message can include the power states of the other nearby multimode device(s) and the current (and future) power states of those device(s). The message can include the transitions or the power states of multiple multimode devices. The transition of the multimode device in 300 can be reported to other nearby multimode devices or can be reported to the controller. The controller can be a network element or another multimode device (e.g., tiered structure). The condition(s) that precipitate(s) the transition of the power state of the multimode device can be reported to the nearby multimode device or the controller. Changes to the power state, the current power state of the multimode device, the status of the terminals in its proximity, the channel conditions, the data rate or QoS requested, or other pertinent information can be reported by the multimode devices to nearby multimode devices or the controller. The transition of the multimode device can be determined in concert with nearby multimode devices or by the controller or autonomously by the multimode device or any combination thereof. The transition of multiple multimode devices can be coordinated and simultaneous. The coordination can occur by the message exchanged by the multimode devices or the multimode devices and the controller.

Figure 4:
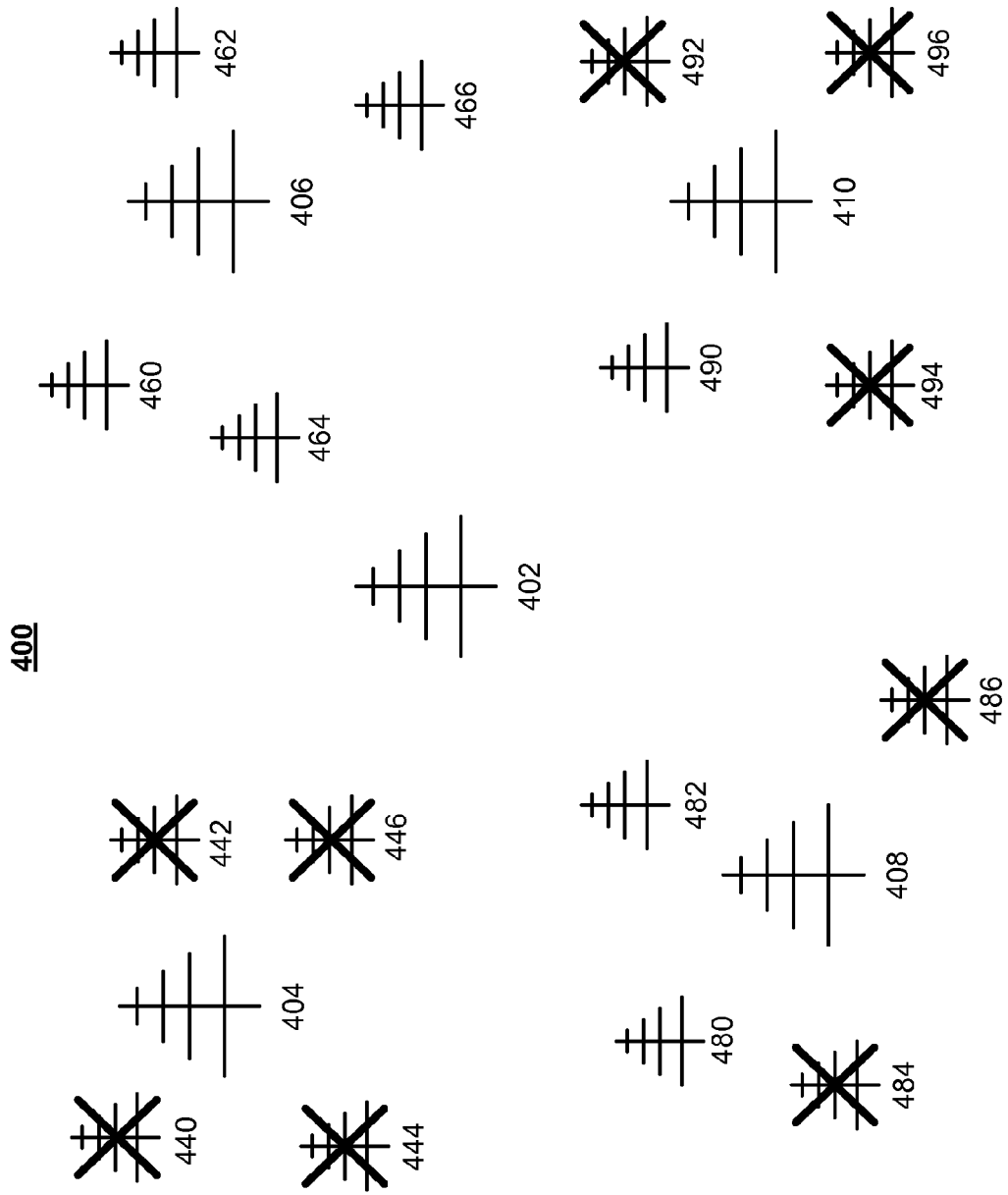
FIG. 4 provides an illustration of a wireless network including base stations for providing power savings and interferences reduction with a tiered power structure in accordance with some embodiments.

FIG. 4 provides an illustration of a wireless network 400 including base stations for providing power savings and interferences reduction with a tiered power structure in accordance with some embodiments. As shown, the tiered power structure of wireless network 400 includes three tiers. The top tier includes a base station 402. The next tier or second/middle tier includes base stations 404, 406, 408, and 410 under base station 402 (e.g., base station 402 is the master and base stations 404, 406, 408, and 410 are the slaves to base station 402). The next tier or lowest/third includes the remaining base stations shown in the wireless network 400, which are slaves to the second/middle tier of base stations 404, 406, 408, and 410. As shown, base stations 440, 442, 444, and 446 are under or slaves to base station 404, base stations 460, 462, 464, and 466 are under or slaves to base station 406, base stations 480, 482, 484, and 486 are under or slaves to base station 408, and base stations 490, 492, 494, and 496 are under or slaves to base station 410. Also as shown, the base stations 440, 442, 444, 446, 484, 486, 492, 494, and 496 are currently in a reduced power state (e.g., as would be apparent to one of ordinary skill in the art, FIG. 4 represents a mere snapshot and such power states and/or tier structure can change over time). For example, an office or university campus, can have a macrocell for the campus (e.g., base station 402), a picocell on a top of one of the office/campus buildings (e.g., base station 410), and a femtocell for a conference room within the building (e.g., base stations 490, 492, 494, and 496). For example, capacity hole/gaps can drive the trend towards an increasing number of base stations and/or the increasing use of combinations of macrocells, picocells, and/or femtocells, which also can result in overlap and redundancy (e.g., power use waste and signal interference in overlap areas).

Figure 5:
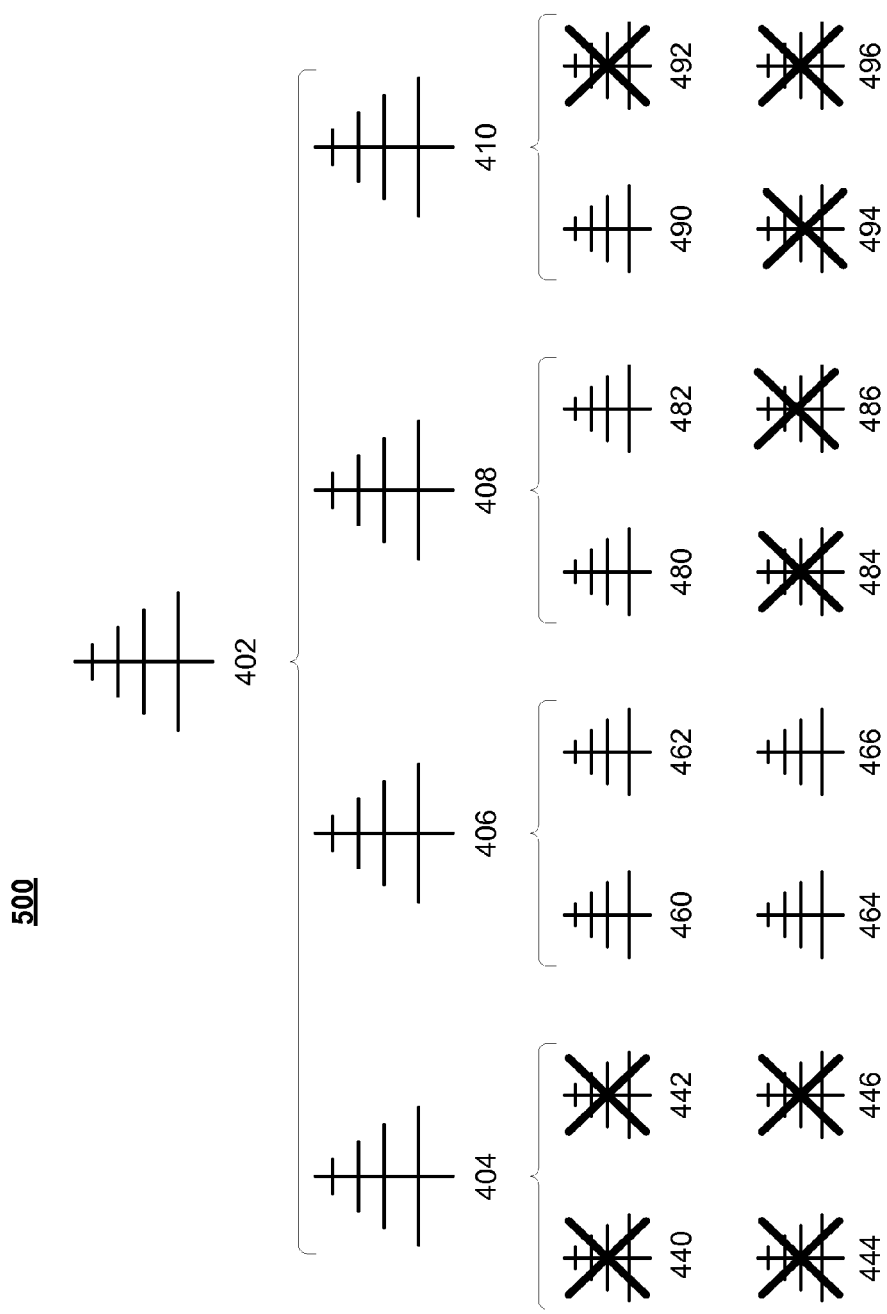
FIG. 5 provides an illustration of another tiered network structure view of a wireless network including base stations for providing power savings and interferences reduction with a tiered power structure of FIG. 4 in accordance with some embodiments.

FIG. 5 provides an illustration of another tiered network structure view 500 of a wireless network 400 including base stations for providing power savings and interferences reduction with a tiered power structure of FIG. 4 in accordance with some embodiments. As shown in FIG. 5, a representation of the tiered network structure and the relationship between each base station as similarly provided and described with respect to FIG. 4 (e.g., an organizational representation of the logical/tiered hierarchy illustrate in the geographical representation of FIG. 4). As would be apparent to one of ordinary skill in the art, the master/slave tiered network structure can be provided using various ratios and numbers of base stations in various tiers and symmetry is not required. Also, certain base stations can be in reduced power states, and, in some embodiments, the master/slave relationships and tiered structure can be dynamically adjusted accordingly. For example, macrocell 402 can be powered off, and/or picocells 404, 406, 408, and 410 can be powered off, and/or any other variation of powered states for any of these network elements. Though shown with three tiers and equally numbered at each tier, this is not necessary. Though shown as a network of only base stations, the example could have equally had a mixture of other network elements (e.g., repeaters, relay nodes). Although FIG. 5 only depicts a single master, a slave can have (e.g., communicate) with multiple masters in some embodiments. In some embodiments, a base station can simultaneously be a master and a slave in a tiered structure (e.g., picocells 404, 406, 408, and 410). In some embodiments, a base station can change from slave to master over time.

Figure 6:
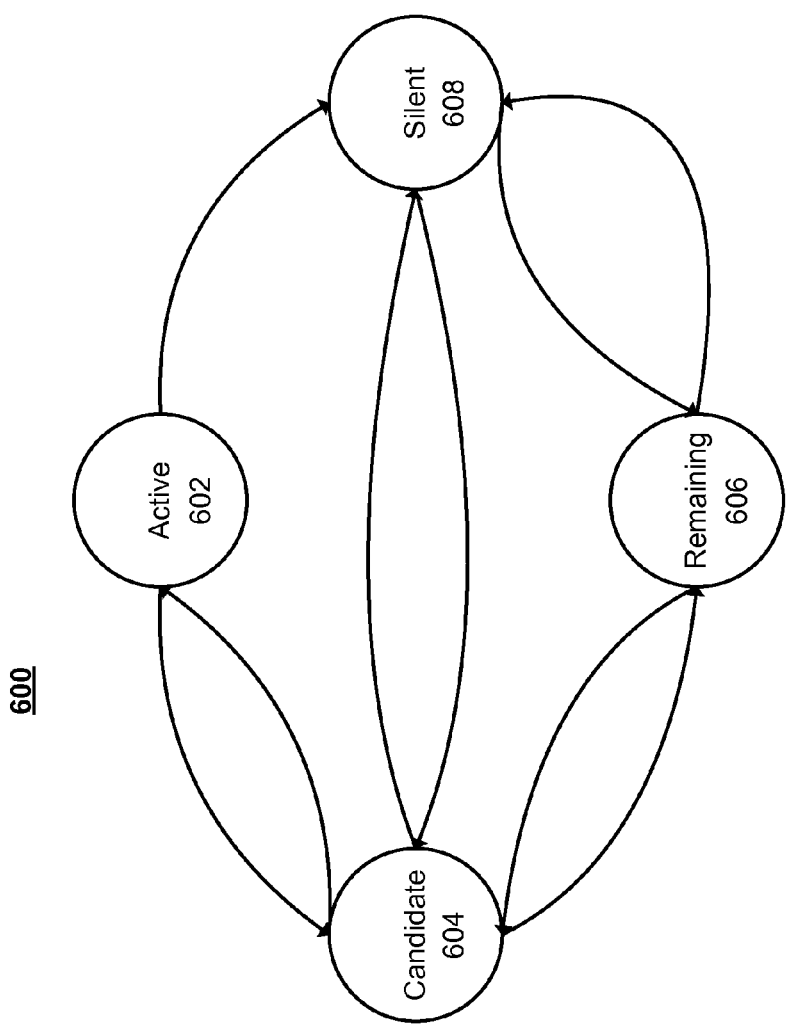
FIG. 6 is a state diagram illustrating another set of power states for a multimode device for providing power savings and interferences reduction in accordance with some embodiments.

FIG. 6 is a state diagram illustrating another set of power states 600 for a multimode device for providing power savings and interferences reduction in accordance with some embodiments. In particular, FIG. 6 illustrates a transition of power states for a base station in a serving power state. In some embodiments, the silent power state and the transition are provided as described herein. In some embodiments, the terminal is informed of the wireless communication presence of a base station in the silent power state so that it can utilize that base station (e.g., if the base station can best serve it, such as based on signal strength and/or geographical proximity and/or other criteria). In some embodiments, the wireless communication presence of the base station in the silent power state is made known to the terminal and potentially to the other multimode devices in the wireless network (e.g., other base stations) or a controller or any combination described above.

Referring to FIG. 6, a multimode device (e.g., base station) can transition from an active power state 602 to a candidate power state 604. In some embodiments, a terminal is communicating with a base station in the active power state. The base station has some form of reduced functionality in the silent power state. For example, a terminal can communicate to a base station in the candidate power state, but the terminal does not currently communicate with the base station in the candidate power state. A terminal can, for example, frequently measure the signal quality of a base station in the candidate power state. A terminal continues to monitor a base station in the remaining power state. A terminal can, for example, monitor the base station in the remaining power state less frequently compared to the terminal's monitoring of a base station in the candidate power state. From the candidate power state 604, the multimode device can transition to a remaining power state 606 or directly to a silent power state 608. From the remaining power state 606, the multimode device can transition to the silent power state 608, and from the silent power state 608, the multimode device can transition back to the remaining power state 606. Also, the multimode device can transition from the active power state 602 to the silent power state 608. From the perspective of a terminal attempting to connect with a multimode device, the terminal can identify potential active, candidate, remaining, and/or silent sets of multimode devices based on various criteria and/or using various techniques as described herein.

Referring to FIG. 6, in some embodiments, the power states described above are associated with the multimode device. In some embodiments, the power states described above are associated with the multimode devices on a per terminal (e.g., or group of terminals) basis. In some embodiments, certain multimode devices are in different power states for different terminals. For example, a multimode device can be in the active power state 602 for a terminal that has established a traffic channel with that multimode device. At the same time, the multimode device can be in the candidate power state 604 with a terminal that it can establish a traffic channel with but has not currently established one with. Furthermore, the multimode device can be in the remaining power state 606 with yet another terminal that is located further away where the terminal is most likely to establish its traffic channel with another multimode device.

In some embodiments, the terminal is associated with multiple multimode devices in certain power states. For example, if the terminal has established a traffic channel with two multimode devices (e.g., hand-off), then both the multimode devices can be in the active power state 602. For example, if the terminal does not have a traffic channel established with any multimode device but can establish a traffic channel with two multimode devices (not necessarily simultaneously), then those multimode devices can be in the candidate power state 604. For example, if there are multimode devices that are further in proximity that other multimode devices, those multimode devices can be in the remaining power state 606. The terminal may measure the attributes (e.g. its channel condition to the multimode devices) of a multimode device in the remaining power state 606 less frequently than the terminal would measure the attributes of the multimode devices in the candidate power state 604 or the active power state 602. Furthermore, the multimode device in the remaining power state 606 can measure the attributes (e.g., its channel condition to the terminal) less frequently.

In some embodiments, the transition of the multimode device occurs autonomously or in concert with other multimode devices in its proximity or with the assistance of a controller or at the direction of a terminal or any combination thereof. In some embodiments, the transition of the power state of the multimode device is determined by the terminal and may not be reported for some period of time (e.g., candidate power state to remaining power state transition). In some embodiments, the transition from one power state to another power state is reported to nearby multimode devices or a controller or a plurality of terminals or any combination thereof. For example, the message informing of the transition or another message can also include the condition (e.g., time) that the multimode device can transition power states again. As another example, a transition from the active power state 602 to silent power state 608 can also include a time that the multimode device to transition to the candidate power state 604 or remaining power state 606 so that the terminal nearby may measure its attributes. In some embodiments, the transition or the condition of that predicates the transition is reported to a controller, and the controller informs the multimode devices (e.g., and potentially other multimode devices) of the transition of the power state or the power state.

In some embodiments, the message informing the power state of the multimode device also includes the transition of the power state of a plurality of multimode devices, the current power state of a plurality of multimode devices, the timing of future transitions, or attributes relevant to the present or future transitions. In some embodiments, the message is directed at a specific terminal. For example, a different message can be directed at different terminals. In some embodiments, the message is broadcasted to a group of terminals.

Figure 7A:
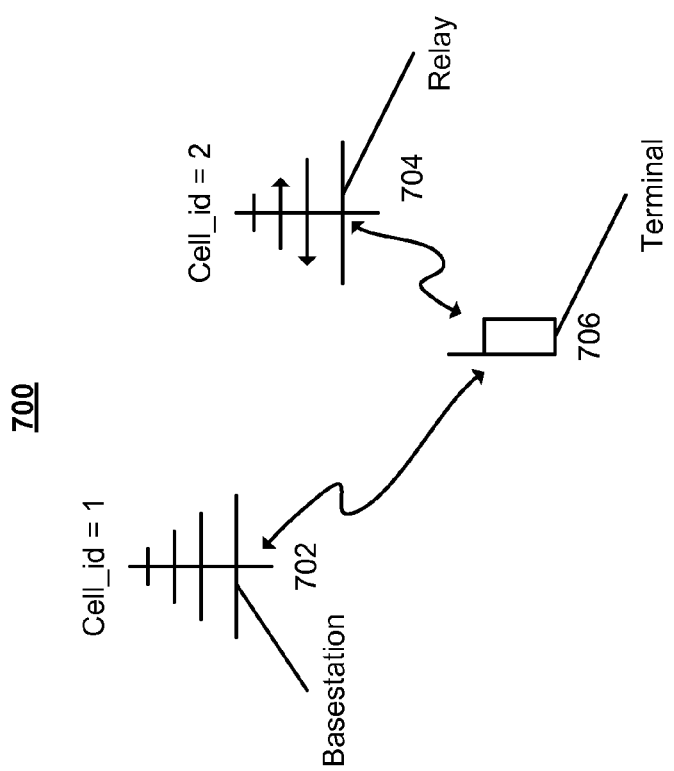
FIGS. 7A-7C provide illustrations of a wireless network for providing power savings and interferences reduction for base station and relays in accordance with some embodiments.
Figure 7B:
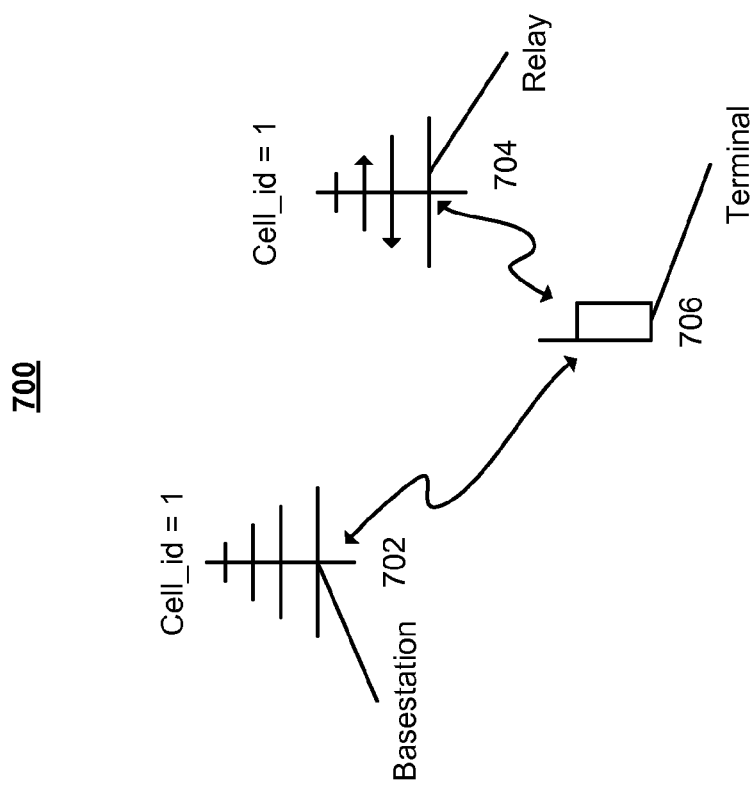
Figure 7C:
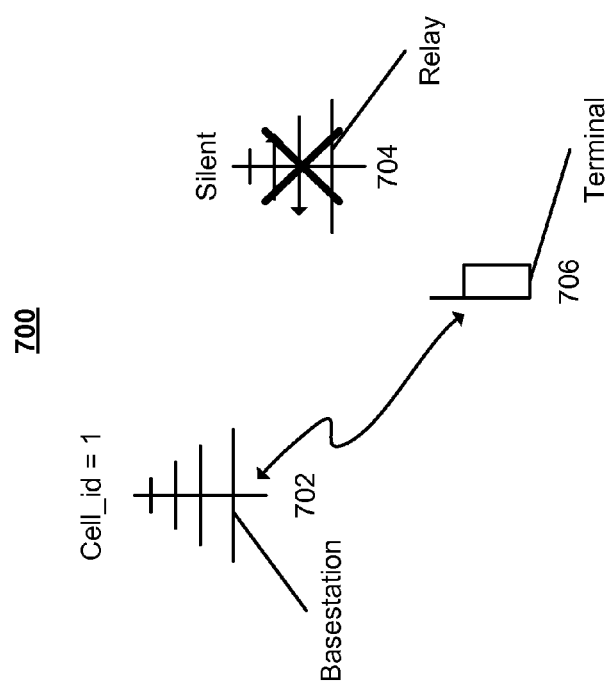
Figure 7D:
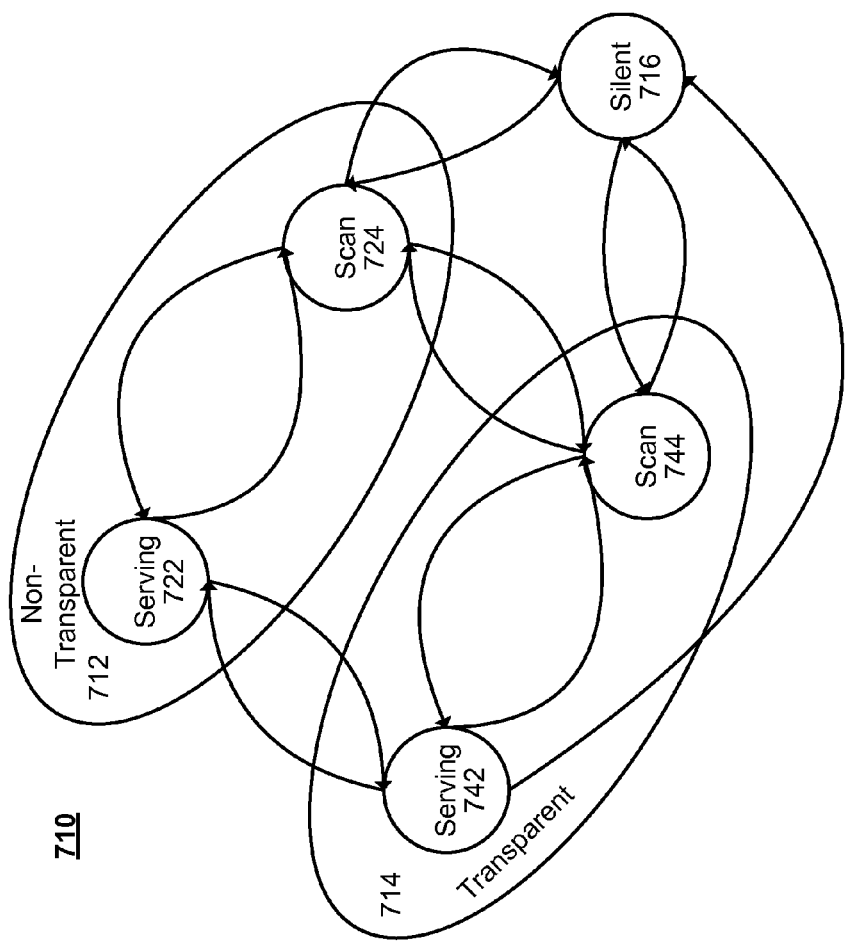
FIG. 7D is a state diagram illustrating a set of power states for a relay node for providing power savings and interferences reduction in accordance with some embodiments.

FIGS. 7A-7C provide illustrations of a wireless network 700 for providing power savings and interferences reduction for base station and relays in accordance with some embodiments, and FIG. 7D is a state diagram (e.g., state machine) illustrating a set of power states 710 (e.g., corresponding power state (and sub-states)) for a relay node (e.g., relay, relay station) for providing power savings and interferences reduction in accordance with some embodiments. As shown in FIG. 7A, the wireless network 700 includes a base station 702, a relay 704, and a terminal 706. In particular, FIG. 7A illustrates a power state transition of the relay 704 from a non-transparent power state 712 (e.g., different Cell_ID=2, unique cell or base station id as recognized by the terminal 706, sometimes referred to as an L2 or L3 repeater, which can, for example, perform additional encoding and/or processing of the data) to a transparent power state 714 (e.g., same Cell_ID=1, same cell as other base station id as recognized by the terminal 706, sometimes referred as L1 relay that performs RF amplification and transmissions, also sometimes referred to as a repeater) as shown in FIG. 7B, and then to a silent state as shown in FIG. 7C, in accordance with some embodiments. FIG. 7D illustrates the set of power states 710 available to the relay in accordance with some embodiments. As shown in FIG. 7A, the terminal 706 is communicating with both the base station 702 and the relay 704. In FIG. 7A, the relay 704 is in the non-transparent power state 712. In the non-transparent power state 712, the relay 704 appears to the terminal as a separate entity (e.g., has a separate Cell_ID, power control, HARQ (hybrid automatic request), etc.). In FIG. 7B, the relay 704 is in the transparent power state 714. In the transparent power state 714, the relay 704 appears as a separate path(s). In FIG. 7C, the relay 704 is in the silent power state 716. In the silent power state 716, the relay 704 does not appear (e.g., does not appear to be present) to the terminal 706. In some embodiments, the relay transitions directly from the non-transparent state to the silent power state. In some embodiments, the relay transitions from the non-transparent state to the transparent state and eventually can transition to the silent state to provide a more smooth or gradual transition in order to, for example, allow for a more gradual hand-off for less abrupt data connection impact, which, for example, allows a terminal more time to transition its data path to remaining base stations. In some embodiments, the relay can similarly transition through these transition states in a reverse order. As will now be apparent to those of ordinary skill in the art in view of the various embodiments described herein, various other power states and various transitions between such power states can be implemented for wireless communication devices, such as multimode devices (e.g., base stations and/or relays, and/or various other multimode devices as described herein) to provide power savings and/or interference reduction for multimode devices.

Referring to FIG. 7D, in some embodiments, the various power states 710 available to the relay are similar to the power states available in FIG. 3 generally for a multimode device. Similar to FIG. 3, one of ordinary skill in the art will appreciate that using various techniques described herein fewer or greater power states in the relay can be implemented. In some embodiments, non-transparent power state 712 is the power state of the relay as described in FIG. 7A. In some embodiments, transparent power state 714 is the power state of the relay as described in FIG. 7B. In some embodiments, silent power state 716 is the power state of the relay as described in FIG. 7C. Non transparent power state 712 and transparent power state 714 can have additional sub-states available in some embodiments. One of ordinary skill in the art will appreciate that using various techniques described herein fewer or greater power sub-states in the relay can be implemented. For example, non-transparent power state 712 can have serving power sub-state 722 and scan power sub-state 724. These are similar to the serving power state 302 and scan power state 306. For example, the transparent power state 714 can have serving power sub-state 742 and scan power sub-state 744. These are similar to the serving power state 302 and scan power state 306. For the transparent power state, in some embodiments, the transparent power sub-state mirrors that of the power state of the donor base station 702.

In some embodiments, the transition of the relay 704 may occur autonomously or in concert with other multimode devices (e.g., including other relays) in its proximity or at the command of the donor (e.g., or would-be donor) base station or with the assistance of a controller (e.g., network element) or any combination thereof. In some embodiments, the transition of the relay from one power state (e.g., including power sub-state) to another power state (e.g., including power sub-state) is reported to nearby multimode devices (e.g., including other relays) and to the terminals nearby. In some embodiments, the transition of the relay from one power state (e.g., including power sub-state) to another power state (e.g., including power sub-state) is not be reported to nearby multimode devices (e.g., including other relays) and to the terminals nearby. For example, transitions of power sub-states in a transparent relay can only be reported to other multimode devices (e.g., including other relays) and other terminals as it pertains to the transition of the donor base station's power state which the transparent relay is mirroring its power sub-states with. Furthermore, in some embodiments, the current power state (e.g., including sub-state) or the transition of the power state (e.g., including sub-state) or a plurality of multimode devices (including relays) is reported to the terminal. In some embodiments, the message includes future transitions, future states of the multimode devices (e.g., including relays), the time of the transition, and/or the length of the transition. For example, he condition(s) that precipitate(s) the transition of the power state can be reported to a controller or the donor (e.g., or would-be donor) base station.

In some embodiments, the power state of the relay is determined by the donor (e.g., or would-be donor) base station 702. In some embodiments, the attributes required to make this determination will be reported by relay 704 to base station 702. In some embodiments, the attributes required to make this determination will be reported to a controller which will then inform relay 704 and base station 702 of the power states. In some embodiments, the power sub-state (e.g., serving power sub-state 722 and scan power sub-state 724) are determined autonomously by the relay 704. In some embodiments, the relay 704 informs base station 702 (e.g., and other multimode devices or controller) or its power sub-state. In some embodiments, the power sub-states in transparent power state will mirror that of the power state of the donor base-station 702. For example, if the donor base station 702 is in the serving power state (e.g., serving power state 302), the relay will be in serving power sub-state 742 if the relay was in the transparent power state 714. For example, if the donor base station 702 is in the scan power state (e.g., scan power state 306), the relay will be in scan power sub-state 744 if the relay was in the transparent power state 714. Furthermore, in some embodiments, if the donor base station was to transition to the silent power state (e.g., silent power state 304) and the relay was in transparent power state 714, the relay transitions from the transparent power state 714 to the silent power state 716.

Silent Base Station and Silent Power State

In Some Embodiments, a Silent Power State and Silent Base Stations are Provided. As discussed above, the base stations can be more than traditional base stations, as used herein, base stations can also include relay nodes, access points, etc. In some embodiments, silent base stations in the silent power state are base stations that do not transmit or transmit in a reduced power state, such as transmitting with less power or transmitting for a shorter period of time or less frequently. In some embodiments, base stations in the silent power state can transition power states to transmit so that a terminal or other base stations can detect their wireless communication presence. For example, such a transmission can occur when requested or in a scheduled fashion. In some embodiments, base stations in the silent power state can transition from the silent power state when a terminal is present (e.g., periodically transitioning to a listen mode or measure mode to detect the presence of a nearby terminal). For example, if the base station transitioned to a silent power state due to interference, then the base station can periodically check to determine if such interference is still present. As another example, the base station can identify known terminals (e.g., a company's employee terminals registered with a femtocell as a closed subscriber group model), and the base station can turn on only if a presence of subscriber group member is detected (e.g., the femtocell can transition from the silent power state to the active power state if a registered employee of the company is present within range of the femtocell).

In some embodiments, the base station in the silent power state transmits less power or less frequently or transmits using fewer channels or entirely ceases transmission. In some embodiments, the base station ceases transmission in the silent power state. For example, power can be lowered using various techniques: the base station can transmit only during certain time periods (e.g., periodically and/or based on a schedule), the base station can implement a listen only mode (e.g., listens for a presence of a terminal, and/or a request to transition from the silent power state to another power state, such as a scan power state or active/serving power state), the base station can transmit only a subset of the control channels or puncture the control channels to reduce power usage for transmit/receive functions of the base station. In some embodiments, the multimode device's transmissions are reduced in power or time in the reduced power state (e.g., silent power state), or the multimode device's transmissions are disabled in the reduced power state (e.g., silent power state). In some embodiments, the multimode device communicates using fewer channels in the reduced power state (e.g., silent power state) or punctures one or more channels in the reduced power state (e.g., silent power state). In some embodiments, the multimode device communicates a discontinuous, punctured, or lower power reference signal in the reduced power state (e.g., silent power state). In some embodiments, the multimode device transitions to the reduced power state (e.g., silent power state) when the base station is not communicating (e.g., not actively communicating) with any terminals and has not communicated with any terminals for a predefined period of time (e.g., a time-out period for a silent power state transition). In some embodiments, the multimode device is in a serving power state while it is communicating with one or more terminals (e.g., and/or base stations and/or other multimode devices). In some embodiments, the reduced power state includes a silent power state, in which the multimode device is not communicating with any terminals, and in which the multimode device's transmissions are reduced or terminated (e.g., transmissions are ceased). In some embodiments, the reduced power state includes a scan power state, in which the multimode device periodically transmits and/or receives as a factor to determine whether to transition the multimode device to a serving power state (e.g., and/or another power state). In some embodiments, the multimode device includes an air interface, which includes a first transceiver, and in which the multimode device periodically transmits and/or receives using a second transceiver as a factor to determine whether to transition the multimode device to a serving power state. In some embodiments, the multimode device periodically transmits and/or receives using a wired communication as a factor to determine whether to transition the multimode device to a serving power state. In some embodiments, the multimode device periodically transmits and/or receives to determine a wireless communication presence of a terminal, in which the wireless communication presence of the terminal is used as a factor to determine whether to transition the multimode device to a serving power state.

In some embodiments, a group of base stations in the silent power state that are in proximity to a terminal constitutes silent set of base stations. In some embodiments, a group of relay nodes in proximity of a macro base station transition to and from the silent set. For example, the wireless network (e.g., a radio network controller or other central control network element in communication with other multimode devices, and/or other multimode devices using various communication and signaling techniques, as described herein) can communicate the identity of the base station(s) in the silent set to the terminals. For example, this list can also include other information, such as the location of the base station(s) in the silent set. The location information can be a relative location or a locale of the base station. In some embodiments, the terminal or the network (e.g., a radio network controller or other central control network element in communication with other multimode devices, and/or other multimode devices using various communication and signaling techniques, as described herein) can request that a silent base station transition states (e.g., from the silent power state to the scan power state or the serving power state). In some embodiments, the request is communicated wirelessly or through a wired interface to the silent base station. For example, a terminal can request a base station in the silent power state to temporarily increase its transmission (e.g., from a state of ceased transmission) so that the terminal can measure the signal strength of the base station. As another example, another multimode device can request that a base station in the silent power state to temporarily increase transmission (e.g., from a state of ceased transmission) so that the terminal can measure the signal strength of the base station. As yet another example, another multimode device can request a base station in the silent power state to transition to an active/serving power state (e.g., or vice versa). As yet another example, a central control network element (e.g., radio network controller or another central control network element) can request a base station in the silent power state to transition to an active/serving power state (e.g., or vice versa).

In some embodiments, a central control network element (e.g., radio network controller or another central control network element) and/or other multimode devices communicate power state status and/or transitions to multimode devices and/or terminals in a wireless network. In some embodiments, a central control network element (e.g., radio network controller or another central control network element) and/or other multimode devices communicate requests to turn on or turn off a cell sector (e.g., to reduce interference).

In some embodiments, the change in power state of a silent base station can be scheduled to allow for multiple silent base stations to be activated in a sequence to allow for the terminal or terminals to measure the base stations' signal. In some embodiments, a timer can be implemented for the base station to transition to the scan power state (e.g., or serving power state or another power state) based on the timer. For example, the terminal can request the wireless network (e.g., and terminal) to reduce the number of terminals that the base station is serving so that the base station can transition to the silent power state.

Tiered Structure and Peer-To-Peer

In some embodiments, a tiered structure of base stations is provided. A base station on a higher level of the tier is referred to herein as a master of its slave base station(s) on a lower level of the tier. To maintain coverage, all of the base stations in a wireless network cannot all be in the silent power state at the same time. In some embodiments, to maintain wireless network coverage, a tiered structure is provided to allow certain base stations to be in, for example, the serving or active power state to provide the coverage while other base stations are allowed to transition to other power states as needed or requested based on various criteria and/or determinations as described herein. For example, in a tiered structure, certain base station(s) or network element(s) can control or help determine the power state of certain base stations to allow for an orderly and efficient transition of other base station power states. In some embodiments, this tier need not be static and can change over time (e.g., a dynamic tiered structure and/or organizational/hierarchical structure). For example, slave base stations can have multiple masters. In some embodiments, a master base station is the base station that helps determine the power state of its slave base station(s). In some embodiments, the master base station is the macro base station and the slave base stations are smaller (e.g., microcells, picocells, and/or femtocells) within the overlapping coverage of the macro base station.

In some embodiments, the communication, topology, control of the power state of the base station is implemented in a peer-to-peer structure. In some embodiments, the base stations in this peer-to-peer structure have overlapping coverage areas. For example, communications between the peers can be provided to determine which base station(s) will remain in and/or transition to the serving power state and which base station(s) will remain in and/or transition to the silent power state. In some embodiments, the base station in this peer-to-peer structure has overlapping coverage area with another base station (e.g., a macro base station). Though this may be similar to the master/slave structure described above as a tiered base station structure, the communication and the determination of the power state of the base station will be determined by the peer-to-peer base station. Furthermore, in some embodiments, hybrid architectures of peer-to-peer and tiered structure can overlap.

In some embodiments, the base station can be grouped to allow the same/similar power states on multiple base stations. The decision of the power states of the base station or the group of base stations can be determined centrally (e.g., radio network controller or another central control network element) or in a decentralized fashion. In some embodiments, relays are included as part of this grouping.

As described herein, implied in this structure exists communications and a protocol to request and to transition the base station. Base stations can direct terminals to other nearby base stations or base stations in the higher or lower tiers without compromise to the wireless communication network service. For example, the communication between the base station and other base stations (e.g., and/or network elements) can occur over a wireless link. In some embodiments, to maintain coverage, a base station in the serving power state will be present. In some embodiments, a base station that transitions to the silent power state uses a serving base station to communicate. In some embodiments, a second transceiver of the silent base station can be used to communicate with the serving base station. In some embodiments, the slave base station can use a second transceiver (e.g., a low power or more power efficient transceiver, such as a phone, such as a GSM phone) to communicate with the master base station to determine the state (e.g., transition from serving, silent, scan, and/or other power states). In some embodiments, with the second transceiver, the silent base station remains in a low power state and uses the second transceiver to perform its communications. As another example, the slave base station can use a wired network connection, such as a T1 connection or Ethernet connection, to communicate with the master base station or a central control network element (e.g., a radio network controller) to communicate its current power state and/or determine its next/requested power state.

Frame Structure and Indicatior Channel

In some embodiments, techniques to embed control information to save power or reduce interference into the frame structure of the wireless link are provided. For example, the control part of the frame structure for power savings mode (e.g., and/or interference reduction) can be multiplexed into the structure of normal operations. For example, the information can be in a frequency band in an FDMA system, or the information can be in a timeslot in a TDMA system. As another example, the information can be in elements in the time-frequency plane of an OFDMA system. As yet another example, the information can also be in an orthogonal code channel in a CDMA system. Furthermore, the information can be any combination of the above. Furthermore, the message can be out of band (e.g., using Wi-Fi or backhaul communication).

Broadly speaking, the control part of the frame can be categorized into a reference signal and control signals. The reference signal can be a beacon or reference signal from the base station. The base stations in silent mode can get its timing and synchronization information by listening to the beacon or reference signal from the base station (e.g., master base station or base station that is not in silent mode) that is transmitting the said information. This reference signal can be a pilot or a discontinuous pilot or a scheduled signal. The reference signal can allow other base station to measure to report or adjust the radio resources to manage interference or prepare for the appropriate terminal to hand in or hand off. For example, the reference signal can take many forms depending on the multiple access technology: orthogonal code for CDMA, time-frequency resource in OFDMA.

The control part of the frame can be manifested in the access format. The control signal can be broadcast in a scheduled fashion in one of the above access methods defined above (e.g., FDMA, TDMA, CDMA, OFDMA, or any combination). The dedicated message can be scheduled using one of the access methods defined above or in a contention based system. In a tiered structure, this message can be between the master base station and slave base station. Furthermore, the message can be between base stations (e.g., peer-to-peer). The messaging can also be between terminal(s) and base station(s). The messaging can be among base stations or broadcasted.

The message can be broadcast by one base station to other base stations or terminals. For example, a base station that is preparing to transition power states can broadcast a message to inform the other base stations or terminals about its power state transition. The power state transition can be, for example, from the serving power state to the silent power state. Also, power state transitions can be from the silent power state to the serving power state. Accordingly, the power state transition can be any transition in the power state as described herein.

In addition, in some embodiments, an indicator channel is provided to allow for the base station communicating with the other base station(s), network elements, or terminal to determine the base station state, to communicate its intention to change its power state, or the base station to request a power state change. The change in state can be the power state (e.g., serving, silent, scan, and/or other power states) or some quantitative state (e.g., transmit power level). Indicator channels require less processing to decode and transmit as would be apparent to one of ordinary skill in the art, and thus, provide an efficient mechanism for communicating power states as described herein.

In some embodiments, information transmitted to the base station whose power state is to be changed includes requests/instructions to lower its power, other resources, etc. For example, information transmitted to the base station in the silent power state can be to transmit its pilot or equivalent so that the terminal can measure its signal (e.g., scan power state). This information can include, for example, the time to transmit its reference signal (e.g., scheduled). Also, information from the base station whose state can be changed can be a request for its resource or power to be changed. Also, it can be information about the current state of the base station (e.g., number of users, data used, etc.).

Transitioning from Non-Transparent to Transparent Relay and Transparent to Silent Relay In some embodiments, the relay node to transition from transparent (e.g., L1 relay) to non-transparent relay (i.e., L2 or L3 relay) and vice versa is provided. A non-transparent relay is a relay with its own identification (e.g., base station ID). Examples of non-transparent relay are a relay which forwards at L2 or L3. A transparent relay is a relay without its own identification. An example of a transparent relay is a L1 or PHY relay. To the terminal, a path from a transparent relay looks like additional path(s) from the donor base station. The donor base station is the base station whose base station ID is the same transparent relay.

For example, to turn off the transmission of a relay node, the relay node can request (or be requested from a network element) to transition from a non-transparent to transparent mode. Afterwards, the transparent relay's transmissions can be turned off. Furthermore, the additional circuitry (e.g., reception) of the relay node can be turned off also. To the terminal, these actions will look as if path(s) have been removed.

Furthermore, a relay node in the silent power state can transition to a transparent mode/transparent power state. Also, the relays station in transparent mode can non-transparent mode/non-transparent power state. Also, the data from the relay can be transmitted or received on a wired link (e.g., backhaul). The same technique can be applied to a radio head and base station. In a radio head, the cell identification can be changed to appear transparent (e.g., appears a path to the terminal) or non-transparent (e.g., appears as a distinct base station to the terminal). Furthermore, a transparent radio head's transmission can cease. The transition can also occur in the other direction.

Those of ordinary skill in the art will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor of a wireless communication device, wherein the wireless communication device includes a multimode device, and wherein the multimode device includes an air interface for communicating with one or more terminals, and the multimode device is configured to:
select a power state of the multimode device selected from a plurality of power states including a first power state, a second power state, and a third power state, wherein the multimode device is in the first power state, and wherein the selected power state is the second power state;
transition the multimode device from the first power state to the second power state;
in the event that A) the multimode device is in the second power state and B) the multimode device 1) receives a transition signal to transition to the first power state or 2) is not communicating with any terminals and has not communicated with any terminals for a predefined period of time, transition the multimode device from the second power state directly to the first power state;
determine whether interference with another multimode device exceeds a predefined threshold;
in the event that A) the interference with the other multimode device exceeds the predefined threshold and B) the multimode device is not in the third power state, transition the multimode device to the third power state; and
in the event that A) the multimode device detects a terminal is present or receives a request to transition to the first power state and B) the multimode device is in the third power state, transition the multimode device from the third power state to the first power state,
wherein the first power state is a serving power state communicating with one or more terminals;
wherein the second power state is a scan power state communicating with the one or more terminals less frequently than in the first power state and more frequently than in the third power state; and
wherein the third power state is a silent power state; and
a memory coupled to the processor and configured to provide the processor with instructions.

2. The system recited in claim 1, wherein the multimode device includes one or more of the following: a macrocell, a microcell, a picocell, a femtocell, an access point, a relay node, a repeater device, and a peer-to-peer terminal.

3. The system recited in claim 1, wherein the multimode device's transmissions are reduced in power or time in the second power state.

4. The system recited in claim 1, wherein the multimode device's transmissions are disabled in the third power state.

5. The system recited in claim 1, wherein the multimode device communicates using fewer channels in the second power state, or wherein the multimode device punctures one or more channels in the second power state.

6. The system recited in claim 1, wherein the multimode device communicates a discontinuous, punctured, or lower power reference signal in the second power state.

7. The system recited in claim 1, wherein the multimode device transitions to the second power state to reduce interference with one or more other multimode devices.

8. The system recited in claim 1, wherein the multimode device is not communicating with any terminals while in the silent power state, and wherein the multimode device's transmissions are terminated while in the silent power state.

9. The system recited in claim 1, wherein the multimode device periodically transmits, receives, or a combination thereof as a factor to determine whether to transition the multimode device from the scan power state to the serving power state.

10. The system recited in claim 1, wherein the air interface includes a first transceiver, and wherein the multimode device periodically transmits, receives, or a combination thereof using a second transceiver as a factor to determine whether to transition the multimode device to the serving power state.

11. The system recited in claim 1, wherein the plurality of power states includes a scan power state, wherein the multimode device periodically transmits, receives, or a combination thereof using a wired communication as a factor to determine whether to transition the multimode device to the serving power state.

12. The system recited in claim 1, wherein the multimode device periodically transmits, receives, or a combination thereof to determine a wireless communication presence of a terminal, wherein the wireless communication presence of the terminal is used as a factor to determine whether to transition the multimode device to the serving power state.

13. The system recited in claim 1, wherein the processor of the multimode device is further configured to:
communicate with a terminal using an air interface.

14. The system recited in claim 1, wherein the processor of the multimode device is further configured to:
transition the multimode device from the serving power state to a silent power state.

15. The system recited in claim 1, wherein the processor of the multimode device is further configured to:
transition the multimode device from the serving power state to the scan power state.

16. The system recited in claim 1, wherein the processor of the multimode device is further configured to:
transition the multimode device from the serving power state to the scan power state, wherein the multimode device periodically determines whether to transition the multimode device to the serving power state.

17. The system recited in claim 1, wherein the processor of the multimode device is further configured to:
transition the multimode device from serving power state to a scan power state, wherein the multimode device periodically transmits, receives, or a combination thereof to a plurality of terminals and/or a plurality of other multimode devices to determine whether to transition the multimode device to the serving power state.

18. The system recited in claim 1, wherein the processor of the multimode device is further configured to:
transition the multimode device from the serving power state to the silent power state;
transition the multimode device from the silent state to the scan power state; and
transition the multimode device from the scan power state to the serving power state.

19. The system recited in claim 1, wherein the processor of the multimode device is further configured to:
transition the multimode device from a non-transparent relay state to a transparent relay state.

20. The system recited in claim 1, wherein the processor of the multimode device is further configured to:
transition the multimode device from a non-transparent relay state to a transparent relay state, and
transition the multimode device from a transparent relay state to the silent power state.

21. The system recited in claim 1, wherein the processor of the multimode device is further configured to:
   implement to a slave mode.

22. The system recited in claim 1, wherein the multimode device is in a first slave mode service state serving as a slave to a first master multimode device, and wherein the processor of the multimode device is further configured to:
   switch to a second slave mode service state serving as a slave to a second master multimode device.

23. The system recited in claim 1, wherein the multimode device is a master multimode device in a master mode, wherein a first set of multimode devices are in a slave mode, wherein the first set of multimode devices serve as slaves to the master multimode device, and wherein the processor of the multimode device is further configured to:
   communicate with one or more of the first set of multimode devices to determine the power states of each of the first set of multimode devices.

24. The system recited in claim 1, wherein the multimode device is a master multimode device in a master mode, wherein a first set of multimode devices are in a slave mode, wherein the first set of multimode devices serve as slaves to the master multimode device, wherein a second set of multimode devices are in a slave mode, wherein the second set of multimode devices serve as slaves to one of the first set of multimode devices, and wherein the processor of the multimode device is further configured to:
   communicate with one or more of the first set of multimode devices to determine the power states of each of the first set of multimode devices; and
   periodically communicate a multimode device power state between the one of the first set of multimode devices and one or more of the second set of multimode devices.

25. The system recited in claim 1, wherein the multimode device is a master multimode device in a master mode, wherein a first set of multimode devices are in a slave mode, wherein the first set of multimode devices serve as slaves to the master multimode device, wherein a second set of multimode devices are in a slave mode, wherein the second set of multimode devices serve as slaves to one of the first set of multimode devices, and wherein the processor of the multimode device is further configured to:
   communicate with one or more of the first set of multimode devices to determine the power states of each of the first set of multimode devices; and
   periodically communicate a multimode device power state between the one of the first set of multimode devices and one or more of the second set of multimode devices, wherein the first set of multimode devices and the second set of multimode devices are overlapping sets.

26. The system recited in claim 1, wherein the multimode device is a master multimode device in a master mode, wherein a first set of multimode devices are in a slave mode, wherein the first set of multimode devices serve as slaves to the master multimode device, wherein a second set of multimode devices are in a slave mode, wherein the second set of multimode devices serve as slaves to one of the first set of multimode devices and the master multimode device, and wherein the processor of the multimode device is further configured to:
   communicate with one or more of the first set of multimode devices to determine the power states of each of the first set of multimode devices;
   periodically communicate a multimode device power state between the one of the first set of multimode devices and one or more of the second set of multimode devices; and
   periodically communicate a multimode device power state between the master multimode device and one or more of the second set of multimode devices.

27. The system recited in claim 1, wherein the processor of the multimode device is further configured to:
   communicate with the one or more terminals from the multimode device to inform the one or more terminals of a wireless communication presence of one or more other multimode devices.

28. The system recited in claim 1, wherein the processor of the multimode device is further configured to:
   communicate with the one or more terminals from the multimode device to inform the one or more terminals of a wireless communication presence of one or more other multimode devices, wherein the one or more other multimode devices are currently in the silent power state or the scan power state.

29. The system recited in claim 1, wherein the processor of the multimode device is further configured to:
   communicate with the one or more terminals from the multimode device to inform the one or more terminals of a power state transition of one or more other multimode devices.

30. The system recited in claim 1, wherein the multimode device is a first multimode device, and wherein the processor of the first multimode device is further configured to:
   communicate with a second multimode device to inform the second multimode device of a wireless communication presence of one or more other multimode devices.

31. The system recited in claim 1, wherein the multimode device is a first multimode device, and wherein the processor of the first multimode device is further configured to:
   communicate with a second multimode device to inform the second multimode device of a wireless communication presence of one or more other multimode devices, wherein the one or more other multimode devices are currently in the silent power state or the scan power state.

32. The system recited in claim 1, wherein the multimode device is a first multimode device, and wherein the processor of the first multimode device is further configured to:
   communicate with a second multimode device to inform the second multimode device of a power state transition of one or more other multimode devices.

33. The system recited in claim 1, wherein the processor of the multimode device is further configured to:
   communicate with a plurality of other multimode devices to turn on or turn off a cell sector.

34. The system recited in claim 1, wherein the processor of the multimode device is further configured to:
   communicate with a plurality of other multimode devices to reduce interference in a cell sector.

35. The system recited in claim 1, wherein the processor of the multimode device is further configured to:
   cease or reduce transmissions from the multimode device while the multimode device is in the second power state.

36. The system recited in claim 1, wherein the processor of the multimode device is further configured to:
   receive a request to transition the multimode device from the silent power state to a temporary transmission state to allow for a signal strength measurement.

37. The system recited in claim 1, wherein the processor of the multimode device is further configured to:
   transition the power state of the multimode device based on a schedule or a timer.

38. The system recited in claim 1, wherein the processor of the multimode device is further configured to:

transition the power state of the multimode device based on a request from another network device.

39. The system recited in claim 1, wherein the processor of the multimode device is further configured to:
transition the power state of the multimode device based on a request from another multimode device.

40. The system recited in claim 1, wherein the processor of the multimode device is further configured to:
transition the power state of the multimode device based on a request from a terminal.

41. A method, comprising:
selecting a power state of the multimode device selected from a plurality of power states including a first power state, a second power state, and a third power state, wherein the multimode device is in the first power state, and wherein the selected power state is the second power state;
transitioning the multimode device from the first power state to the second power state;
in the event that A) the multimode device is in the second power state and B) the multimode device 1) receives a transition signal to transition to the first power state or 2) is not communicating with any terminals and has not communicated with any terminals for a predefined period of time, transitioning the multimode device from the second power state directly to the first power state;
determining whether interference with another multimode device exceeds a predefined threshold;
in the event that A) the interference with the other multimode device exceeds the redefined threshold and B the multimode device is not in the third power state transitioning the multimode device to the third power state; and
in the event that A) the multimode device detects a terminal is present or receives a request to transition to the first power state and B) the multimode device is in the third power state, transitioning the multimode device from the third power state to the first power state,
wherein the first power state is a serving power state communicating with one or more terminals;
wherein the second power state is a scan power state communicating with the one or more terminals less frequently than in the first power state and more frequently than in the third power state; and
wherein the third power state is a silent power state.

42. A computer program product, the computer program product being embodied in a non-transitory computer readable storage medium and comprising computer instructions for:
selecting a power state of the multimode device selected from a plurality of power states including a first power state, a second power state, and a third power state, wherein the multimode device is in the first power state, and wherein the selected power state is the second power state;
transitioning the multimode device from the first power state to the second power state;
in the event that A) the multimode device is in the second power state and B) the multimode device 1) receives a transition signal to transition to the first power state or 2) is not communicating with any terminals and has not communicated with any terminals for a predefined period of time, transitioning the multimode device from the second power state directly to the first power state;
determining whether interference with another multimode device exceeds a predefined threshold;
in the event that A) the interference with the other multimode device exceeds the predefined threshold and B) the multimode device is not in the third power state, transitioning the multimode device to the third power state; and
in the event that A) the multimode device detects a terminal is present or receives a request to transition to the first power state and B) the multimode device is in the third power state, transitioning the multimode device from the third power state to the first power state,
wherein the first power state is a serving power state communicating with one or more terminals;
wherein the second power state is a scan power state communicating with the one or more terminals less frequently than in the first power state and more frequently than in the third power state; and
wherein the third power state is a silent power state.

43. A system, comprising:
a processor of a wireless communication device, wherein the wireless communications device includes a terminal, and wherein the terminal is configured to:
communicate with one or more multimode devices using an air interface, wherein the one or more multimode devices include wireless base stations;
determine a plurality of power states of the one or more multimode devices, wherein the plurality of states including a first power state, a second power state, and a third power state;
in the event that A) the multimode device is in the second power state and B) the multimode device 1) receives a transition signal to transition to the first power state or 2) is not communicating with any terminals and has not communicated with any terminals for a predefined period of time, transition the one or more multimode devices from the second power state directly to the first power state;
determine whether interference with another multimode device exceeds a predefined threshold;
in the event that A) the interference with the other multimode device exceeds the predefined threshold and B) the multimode device is not in the third power state, transition the multimode device to the third power state; and
in the event that A) the multimode device detects a terminal is present or receives a request to transition to the first power state and B) the multimode device is in the third power state, transition the multimode device from the third power state to the first power state,
wherein the first power state is a serving power state communicating with one or more terminals;
wherein the second power state is a scan power state communicating with the one or more terminals less frequently than in the first power state and more frequently than in the third power state; and
wherein the third power state is a silent power state; and
a memory coupled to the processor and configured to provide the processor with instructions.

44. The system recited in claim 43, wherein the processor of the wireless communication device is further configured to:
select a first multimode device of the one or more multimode devices for wireless communication based on the determined power state of the first multimode device.

45. A system, comprising:
a processor of a central wireless network control device configured to:

communicate with one or more multimode devices, wherein the one or more multimode devices include wireless base stations;

determine a plurality of states of the one or more multimode devices, wherein the plurality of states including a first power state, a second power state, and a third power state;

in the event that A) the multimode device is in the second power state and B) the multimode device 1) receives a transition signal to transition to the first power state or 2) is not communicating with any terminals and has not communicated with any terminals for a predefined period of time, transition the one or more multimode devices from the second power state directly to the first power state;

determine whether interference with another multimode device exceeds a predefined threshold;

in the event that A) the interference with the other multimode device exceeds the predefined threshold and B) the multimode device is not in the third power state, transition the multimode device to the third power state; and in the event that A) the multimode device detects a terminal is present or receives a request to transition to the first power state and B) the multimode device is in the third power state, transition the multimode device from the third power state to the first power state, wherein the first power state is a serving power state communicating with one or more terminals;

wherein the second power state is a scan power state communicating with the one or more terminals less frequently than in the first power state and more frequently than in the third power state; and wherein the third power state is a silent power state; and a memory coupled to the processor and configured to provide the processor with instructions.

46. The system recited in claim 45, further comprising:
send a power state transition request to a first multimode device of the one or more multimode devices for wireless communication based on the determined power state of the first multimode device, wherein the power state transition request includes a request instructing the first multimode device to transition from the first power state to the second power state, and wherein the central network control device includes a radio network controller.

47. The system recited in claim 1, wherein in the event that A) the multimode device is in the second power state and B) the multimode device 1) receives a transition signal to transition to the first power state or 2) is not communicating with any terminals and has not communicated with any terminals for a predefined period of time, the transitioning of the multimode device from the second power state is directly to the first power state without transitioning to the third power state.

48. The system recited in claim 1, further comprising:
in the event that the multimode device transitioned to the third power state due to the interference with the other multimode device exceeding the predefined threshold:
periodically determining whether the interference with the other multimode device does not exceed the predefined threshold; and
in the event that the interference with the other multimode device does not exceed the predefined threshold, transition the multimode device to the first power state.

* * * * *

UNITED STATES PATENT AND TRADEMARK OFFICE
CERTIFICATE OF CORRECTION

PATENT NO. : 8,811,905 B1
APPLICATION NO. : 12/873173
DATED : August 19, 2014
INVENTOR(S) : Hui et al.

It is certified that error appears in the above-identified patent and that said Letters Patent is hereby corrected as shown below:

In the claims

In Column 21, Line 31 in Claim 41, delete "redefined" and insert --predefined--, therefor.

In Column 21, Line 31 in Claim 41, after "and" delete "B" and insert --B)--, therefor.

Signed and Sealed this
Ninth Day of August, 2016

Michelle K. Lee
*Director of the United States Patent and Trademark Office*